Figure 1:
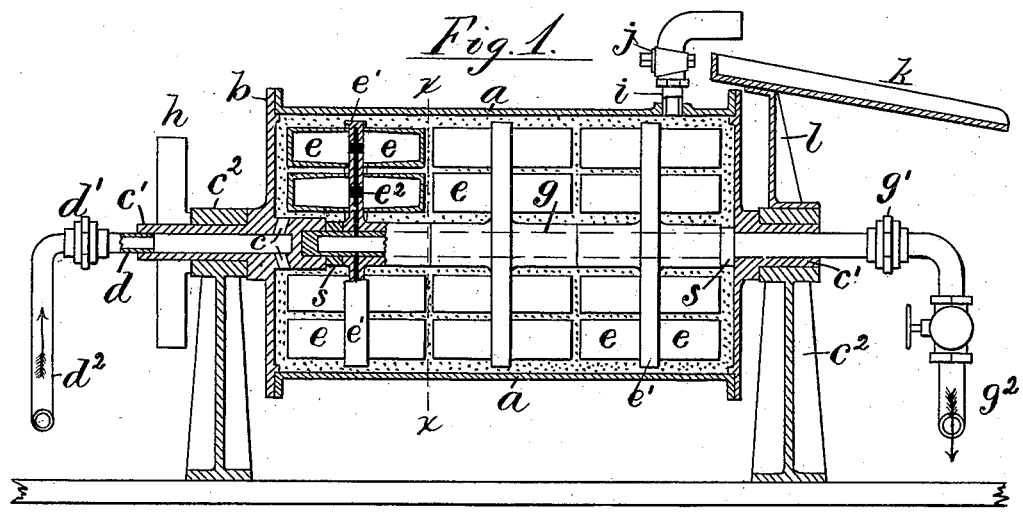

(No Model.)

J. W. HYATT.
ROTATING OR OSCILLATING FILTER.

No. 376,095. Patented Jan. 10, 1888.

Attest:
L. Lee,
F. C. Fischer,

Inventor.
John W. Hyatt per
Crane & Miller, Attys.

UNITED STATES PATENT OFFICE.

JOHN W. HYATT, OF NEWARK, NEW JERSEY, ASSIGNOR TO THE HYATT PURE WATER COMPANY.

ROTATING OR OSCILLATING FILTER.

SPECIFICATION forming part of Letters Patent No. 376,095, dated January 10, 1888.

Application filed April 21, 1887. Serial No. 235,622. (No model.)

*To all whom it may concern:*

Be it known that I, JOHN W. HYATT, a citizen of the United States, residing at Newark, Essex county, New Jersey, have invented certain new and useful Improvements in Rotating or Oscillating Filters, which improvements are fully described and represented in the following specification and the accompanying drawings, forming a part of the same.

The object of this invention is to cleanse the surfaces of solid filtering-diaphragms by abrasion with granular material, and the construction is intended to obviate the necessity for using a current of water sufficient to move the granular material in contact with the filtering-surfaces, as claimed by me in my patent application No. 219,574, filed November 23, 1886, or the arrangement of the filter-diaphragms movably within the casing for friction against abrading material, as in my patent application No. 232,238, filed March 28, 1887.

In my present invention I fix the solid filtering media within a rotary or oscillating casing and place within the casing loose abrading material adapted, when the casing is turned or oscillated, to move by its gravity in contact with the filtering-surfaces, and to thus cleanse them in the desired manner.

In the drawings my invention is shown applied to a cylindrical casing, with the filter-diaphragms constructed as porous cups similar to those used in galvanic batteries, and attached by their open mouths to hollow plates, as claimed by me in a copending patent application.

Figures 2, 3:
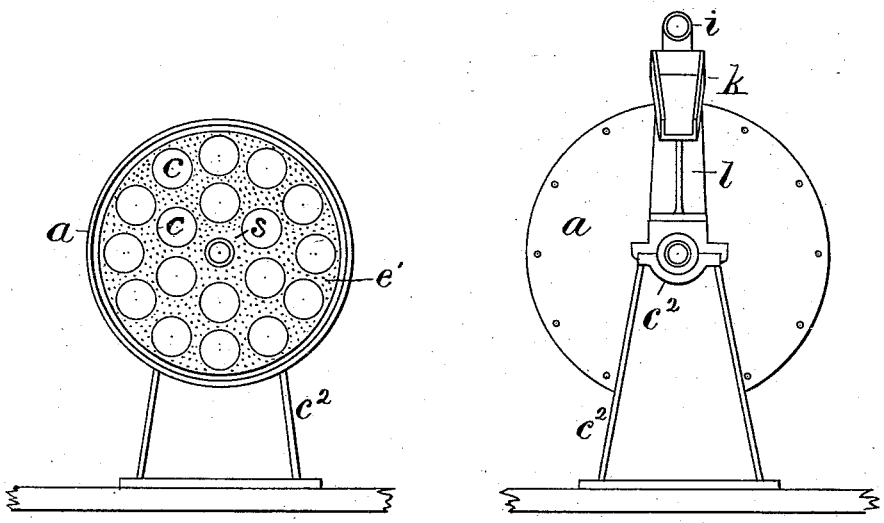

In the drawings, Figure 1 is a central longitudinal section of the filter-casing mounted upon trunnions in stationary bearings. Fig. 2 is a transverse section on line $x\ x$ in Fig. 1; and Fig. 3 is an end elevation at the right hand of Fig. 1, with the outlet pipe and cock omitted.

$a$ is the filter casing, provided with removable heads $b$, having each a hollow trunnion, $c'$, mounted in a pedestal, $c^2$. A pipe, $d$, is connected by a swivel-coupling, $d'$, with a supply-pipe, $d^2$, which furnishes the water to be purified. The water passes from pipe $d$ into the hollow trunnion, and through holes $c$ to the interior of the casing, where it presses upon the surfaces of the porous cups $e$. Six series of cups $e$ are shown attached to plates $e'$, of disk form, mounted upon a shaft, $g$, within the casing, and two of the upper left-hand cups are represented in section, showing their open mouths attached to the hollow plate $e'$, within which is a water channel, $e^2$, from which the fluid passes to the interior of the shaft $g$, which is made hollow and connected by a swivel, $g'$, to an outlet-pipe, $g^2$, for the filtered water.

The casing is partially filled with granular abrading material—as sand or coke—and operates to cleanse the surfaces of the cups $e$ when the filter-casing is moved, for which purpose a wheel, $h$, is affixed to one of the trunnions, and may be rotated by a belt or furnished with cogs and actuated by suitable gearing.

When filtering, the water enters through the pipe $d$ and is diffused through the interior of the casing, penetrating the substance of the solid filtering-cups $e$ and passing by the shaft $g$ to the outlet $g'$.

If the casing be rotated or oscillated continuously during the filtering operation, the abrading material would be moved by its gravity into contact with the various surfaces of the filter-cups, and thus remove the impurities deposited thereon.

The filtration may, if preferred, be performed without moving the casing for a given period of time, and the rotation or oscillation of the casing would then serve to cleanse the filter-cups for further use during a certain period.

The impurities removed from the filtering-surface by the abrading material would obviously accumulate within the casing, and to discharge the same a waste-pipe, $i$, provided with cock $j$, is furnished at one side of the casing, and may be turned so as to discharge the fluid within the casing into a trough, $k$, to conduct it from the vicinity of the filter. The trough is shown mounted above one of the pedestals upon a standard, $l$, and the waste-pipe, when turned to such trough, would thus be upon the upper side of the casing and prevent the abrading material from obstructing the pipe during the discharge of the impure fluid.

To effect the discharge of the impurities, the supply would be continued through the pipe $d^2$, and the discharge from the pipe $g^2$ would be stopped by means of a cock, $g^3$.

The hollow plates $e'$ are shown formed with hubs $o$, by which they are fitted upon the hollow shaft $g$ and clamped thereon by nuts $s$; but flat plates or tubes may be used for the filtering media, provided they are fixed within the casing and the latter be mounted to rotate so as to turn the abrading material successively into contact with all the filtering-surfaces.

I am fully aware that it is old to form a filter-bed of loose granular material within a rotating or oscillating casing, and that it is common to turn such casing for the purpose of breaking up the filter-bed to dislodge the impurities that the same may be removed with a current of water. My present improvement differs radically from such construction, as it is absolutely essential to my invention that the filtering media shall be permanent in form and solid in structure, so as to resist the friction and wear of the particles of loose abrading material which I use to cleanse their surfaces. My invention also differs from the loose filter-beds referred to in that the cleansing of its filtering-surfaces may be practiced continuously during the filtering operation, while the cleansing of a bed of loose granular material serves to destroy its filtering functions so far as it is disintegrated and washed.

I wholly disclaim the use of loose granular material as a filtering agent, and any filtering function which the granular material may perform in my present construction is wholly immaterial to the operation of the invention. Such function might be partly performed if the casing were held stationary during the filtering operation and the abrading material agitated only at intervals by the turning of the casing; but I do not consider that any filtration would be performed by the loose granular material if the casing were continuously rotated, which I prefer to do in practicing my invention, that the filtering-surfaces may be kept in a higher state of efficiency.

I hereby disclaim my patent application No. 219,574, filed November 23, 1886, in which I have claimed, broadly, the combination, with solid filtering media, of abrading material placed in the unfiltered fluid, and means for agitating the material and the filtering media in relation to one another.

The essential elements of my present invention are a casing having filtering media fixed therein, the abrading material in contact therewith, and means for turning or oscillating the casing to abrade the filtering media by the movements thus induced among the particles of the abrading material, and which movements operate to cleanse the filtering-surfaces by causing a frictional contact of the abrading particles with the surfaces of the filtering media.

Having thus set forth my invention and distinguished it from others, what I claim herein is—

1. The combination, with a filter-casing capable of rotation, of one or more solid filter-diaphragms fixed within the casing, loose abrading material within the casing in contact with the said diaphragms, an inlet to the casing for the unfiltered water, and an outlet from the filter-diaphragms for the purified water, the whole arranged and operated to turn the abrading material into contact with the surfaces of the diaphragms, as and for the purpose set forth.

2. In a filter, the combination, with a casing mounted upon trunnions and containing one or more solid filtering media, of an inlet to the casing for the unfiltered water, an outlet from the filtering media through the trunnion for the filtered fluid, and loose abrading material in contact with the filtering media and adapted to cleanse the surfaces of the filtering media when the casing is rotated, as and for the purpose set forth.

3. In a filter, the combination, with a casing mounted upon trunnions, of an inlet to the casing conveying the unfiltered water through one of said trunnions, a series of hollow plates mounted upon a hollow shaft and having hollow filter-cups attached thereto, and an outlet from the hollow shaft through the other trunnion, and loose abrading material within the casing arranged and operated to cleanse the surfaces of the filter-cups when the casing is turned, substantially as herein set forth.

4. In a filter, the combination, with a casing capable of rotation and containing a series of filtering media, of an inlet to the casing for the unfiltered fluid, an outlet from the filtering media for the filtered fluid, loose abrading material within the casing arranged and operated to cleanse the filtering media when the casing is turned, and a waste-pipe for discharging the impurities from the casing, as and for the purpose set forth.

5. In a filter, the combination, with a casing capable of rotation and containing a series of filtering media, of an inlet to the casing for the unfiltered fluid, an outlet from the filtering media for the filtered fluid, loose abrading material within the casing operated to cleanse the filtering media when the casing is turned, means for closing the outlet for the filtered fluid, a waste pipe and cock for discharging the impurities from the casing, and a trough or pipe for receiving the impurities discharged from the waste-pipe when turned to coincide therewith, the whole arranged and operated substantially as herein set forth.

In testimony whereof I have hereunto set my hand in the presence of two subscribing witnesses.

JOHN W. HYATT.

Witnesses:
L. LEE,
THOS. S. CRANE.